(12) United States Patent
Tisol, Jr.

(10) Patent No.: US 7,306,190 B2
(45) Date of Patent: Dec. 11, 2007

(54) FASTENER

(75) Inventor: James S. Tisol, Jr., Chippewa Falls, WI (US)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/224,542

(22) Filed: Sep. 12, 2005

(65) Prior Publication Data

US 2006/0127172 A1    Jun. 15, 2006

Related U.S. Application Data

(60) Provisional application No. 60/635,225, filed on Dec. 10, 2004.

(51) Int. Cl.
*A47G 1/17*    (2006.01)

(52) U.S. Cl. .......................... 248/206.5; 24/303; 403/2; 248/309.4

(58) Field of Classification Search ................. 403/42, 403/72, 74, 76, 144, 164, 119, 179, 329, 180, 403/182, DIG. 1, 121, 137, 397, 326, DIG. 14; 248/683, 537, 206.5, 309.4; 24/303, 289, 24/297; 296/214; 411/2, 5, 476
See application file for complete search history.

(56) References Cited

U.S. PATENT DOCUMENTS

| 4,122,583 | A | * | 10/1978 | Grittner et al. ............ 24/703.1 |
|---|---|---|---|---|
| 4,713,861 | A | * | 12/1987 | Bancroft ........................ 16/222 |
| 4,846,374 | A | * | 7/1989 | Gabrys .................... 222/153.09 |
| 4,987,639 | A | * | 1/1991 | Baiuley et al. ............... 16/445 |
| 5,280,991 | A | | 1/1994 | Weiland |
| 5,540,528 | A | * | 7/1996 | Schmidt et al. ............... 411/55 |
| 5,580,204 | A | * | 12/1996 | Hultman ..................... 411/509 |
| 5,689,863 | A | * | 11/1997 | Sinozaki ....................... 24/297 |
| 5,759,002 | A | * | 6/1998 | Essenberg .................... 411/45 |
| 6,322,305 | B1 | * | 11/2001 | Bantle ......................... 411/41 |
| 6,477,749 | B1 | * | 11/2002 | Reiter ......................... 24/303 |
| 6,484,904 | B1 | * | 11/2002 | Horner et al. .............. 222/137 |
| 6,699,253 | B2 | * | 3/2004 | McDowell et al. ........... 606/80 |
| 6,846,313 | B1 | * | 1/2005 | Rogers et al. ................ 606/72 |
| 6,857,809 | B2 | * | 2/2005 | Granata ..................... 403/121 |
| 6,895,642 | B2 | * | 5/2005 | Huang ......................... 24/303 |
| 6,932,552 | B2 | * | 8/2005 | Anscher et al. .............. 411/41 |
| 7,017,239 | B2 | * | 3/2006 | Kurily et al. ................ 24/297 |
| 2004/0181917 | A1 | * | 9/2004 | Sawatani ..................... 24/297 |
| 2004/0258471 | A1 | * | 12/2004 | Granata ..................... 403/381 |
| 2005/0086773 | A1 | * | 4/2005 | Kuhnle et al. ................ 24/297 |

* cited by examiner

*Primary Examiner*—Gregory J. Binda
*Assistant Examiner*—Daniel Mills
(74) *Attorney, Agent, or Firm*—Mark W. Croll; Paul F. Donovan

(57) ABSTRACT

A fastener is provided particularly useful for securing automobile headliners to automobile roofs. The fastener includes a clip connectable to the headliner and a magnet assembly that can be secured to the roof. The magnet assembly can tilt relative to the clip.

19 Claims, 3 Drawing Sheets

FASTENER

CROSS-REFERENCE TO RELATED APPLICATIONS

The present regular United States patent application claims the benefits of U.S. Provisional Application Ser. No. 60/635,225, filed on Dec. 10, 2004.

FIELD OF THE INVENTION

The present invention relates generally to fasteners commonly referred to as clips, adapted to secure one panel or structure to another panel or structure, and, more specifically to blind fasteners used to secure automobile headliners to automobile roofs.

BACKGROUND OF THE INVENTION

Many different types of fastening clips are used in structures and assemblies to secure one panel or covering to another component of the structure or assembly. Fastening clips are particularly useful in automobile assemblies to secure headliners, interior panels and the like to roofs, door structures and other components.

It is known to use various interior automobile mechanisms to assist in retaining a headliner in position against the automobile roof. For example, structures such as center consoles, dome lights, trim pieces and visors assist in holding an automobile headliner to the underlying roof. However, many of these structures are provided only around the periphery of the headliner. While a dome light or the like may be provided somewhat centrally in the roof area, extensive expanses of the headliner are not supported or secured by such structures. Accordingly, it is desirable to provide an inconspicuous, concealed attachment between the headliner and the underlying roof structure through the otherwise unsupported expanses of the headliner. Without such fasteners, the headliner can sag, providing an aesthetically unacceptable appearance.

It is known to use fastener clips to further secure headliners to automobile roofs. An automobile headliner is typically made of cloth, foam or other suitable material and generally includes a suitable substrate layer. A fastener clip is secured to the substrate by an adhesive, such as glue, and is attached to the underlying roof structure by one of several known arrangements.

One problem with known fastener clips is that the clip must be secured in a hole, slot, doghouse or other mating structure on the roof after the clip has been secured to the headliner. Typically, this results in a blind fastener installation because the assembler is not able to view either the fastener clip or the structure in the roof to which the clip is being attached. To facilitate installation of fastener clips between headliners and automobile roofs it is known to use magnetic fastener clips, thereby eliminating the difficulty of a blind fastener application. Since the roof is normally metal, the magnet will connect thereto whenever it is brought in close proximity with the roof. Known magnetic fastener clips are secured to the headliner in typical fashion, such as be adhesive, and then to the mating roof structure by way of the magnet. With magnetic fastening clips the assembler no longer must align a fastener with a mating hole and attach the fastener to the hole.

While magnetic fasteners of the type generally described have facilitated installation of automobile headliners, there is a continuing need for improved structures and arrangements for such clips. Assembly conditions on an automobile assembly line can be somewhat harsh, and a more robust clip, more durable under assembly conditions will provide advantages. Further, it is desirable that the fastening clip have a long useful life to support the headliner and prevent staking throughout the anticipated life expectancy of the vehicle. It is desirable also for the fastener clip to have some give or flexibility incorporated therein. During installation the headliner can be moved stretched or twisted inconsistently. Once installed, during use of the automobile, the headliner is sometimes contacted or pushed by passengers. Known clips can break or otherwise fail under these conditions. If the fastener clip is broken after installation of the headliner, sagging can occur again presenting the aesthetically undesirable appearance. Further, replacement of an installed, broken clip can be difficult.

SUMMARY OF THE INVENTION

The present invention provides a fastener having a clip which attaches to an automobile headliner or the like using adhesive, and which firmly connects to a magnet or other assembly for connection to another component, while allowing the magnet or other assembly to tilt relative to the fastener clip.

In one aspect thereof, the present invention provides a fastener with a fastener clip having a base and a post with deflectable legs. A magnet assembly defines a hole having a diameter for receiving the legs therethrough. A protuberance on at least one of the legs overlaps a portion of the magnet assembly adjacent the hole. A pin disposed between the legs prevents inward deflection of the legs for securing the protuberance in the overlapping position.

In another aspect thereof, the present invention provides a fastener clip with a base, a dome spaced from the base and a plurality of supports between the base and the dome. A hollow post extends outwardly of the dome and includes at least one deflectable portion having an outward protuberance thereon. A pin is substantially aligned with the post and connected thereto by at least one frangible link.

In a still further aspect thereof, the present invention provides an automobile headliner fastener, with a fastener clip including a base adapted for attachment to a headliner, a dome in spaced relationship to the base and a plurality of supports between the base and the dome. A post projects outwardly of the dome opposite the base. The post is hollow and has a deflectable portion having an outward protuberance thereon. A magnet assembly includes a carrier disposed on the post and a magnet disposed in the carrier. The carrier has a bottom encircling the post between the dome and the protuberance. A pin is disposed in the hollow post adjacent the deflectable portion.

An advantage of the present invention is providing a fastener clip that is both robust and resilient to damage during installation and use.

Another advantage of the present invention is providing a fastener clip that is particularly useful for attaching automobile headliners to the underlying automobile roof structure, and that connects both easily and securely to a magnet assembly.

Another advantage of the present invention is providing a fastener clip that can be manufactured easily and inexpensively as a single molded part that subsequently can be separated into individual components.

Other features and advantages of the invention will become apparent to those skilled in the art upon review of the following detailed description, claims and drawings in which like numerals are used to designate like features.

Figure 1:
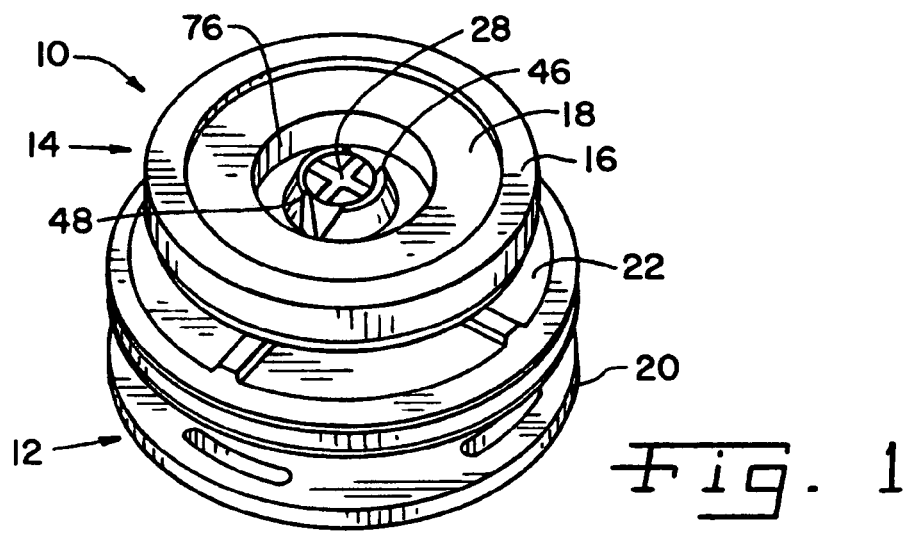
FIG. 1 is a perspective view of a fastener in accordance with the present invention, including a clip and a magnet assembly attached to one end of the clip.
Figure 2:
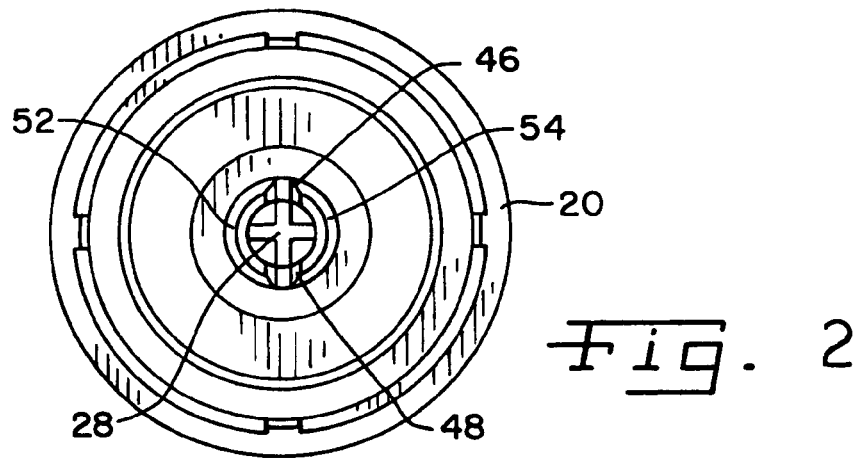
FIG. 2 is a top view of the fastener shown in FIG. 1.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a fastener in accordance with the present invention. Fastener 10 shown in the exemplary embodiment is suitable for use as a blind fastener to attach an automobile headliner to the roof of an automobile. However, it should be understood that the principles of the present invention can be used in fasteners of other types and for purposes other than fastening automobile components.

Fastener 10 includes a clip portion 12 and a magnet assembly 14 including a carrier 16 and a magnet 18. Clip 12 can be made of plastic by injection molding or other suitable processes. Clip 12 also can be made of other suitable materials. In a preferred embodiment, carrier 16 is made of metal so that magnet 18 can be carried and retained therein without attachment, although adhesive can be used. Carrier 16 is connected to clip 12 by attaching structure to be explained subsequently herein.

Clip 12 includes a base 20, a dome 22 in spaced relation to base 20, at least one support 24, 26 disposed between and interconnecting base 20 and dome 22, and a pin 28. In the exemplary embodiment shown, clip 12 includes two supports 24, 26 although a single support or more than two supports can also be used.

Figure 3:
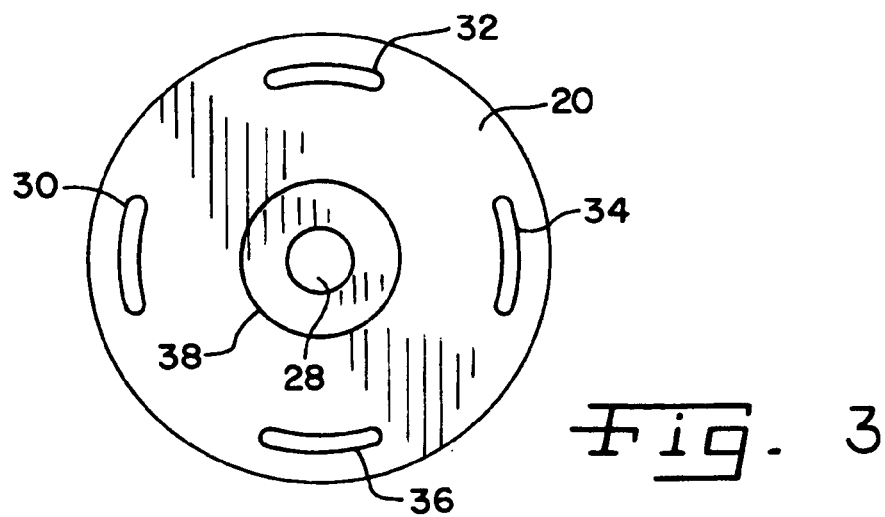
FIG. 3 is a bottom view of the fastener shown in FIGS. 1 and 2.
Figure 4:
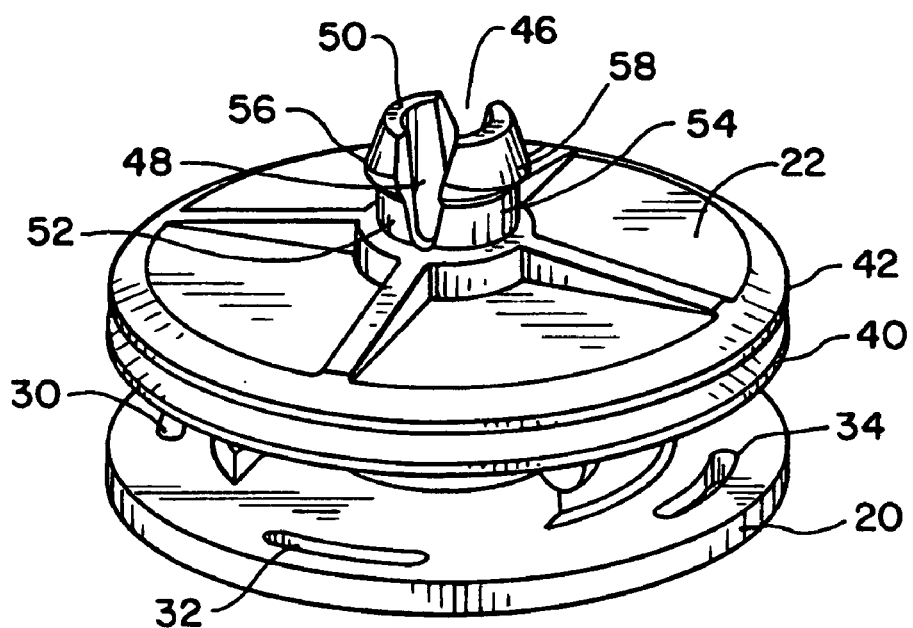
FIG. 4 is a perspective view of the fastener clip as manufactured, before attachment to a magnet assembly.
Figure 5:
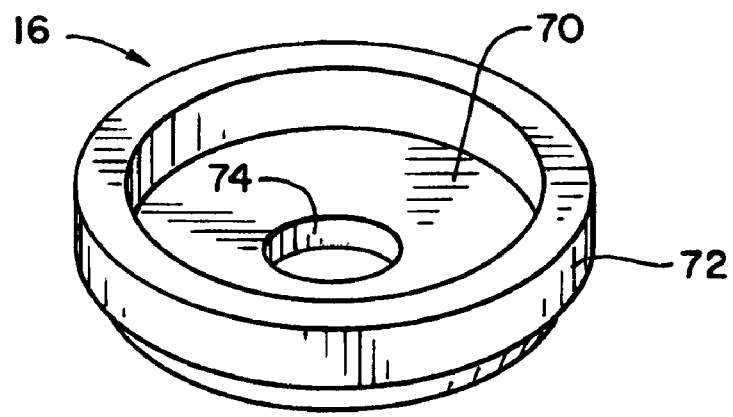
FIG. 5 is a perspective view of a carrier for the magnet assembly of a fastener clip in accordance with the present invention.

Base 20 is substantially circular, although other shapes and configurations also can be used. As seen most clearly in FIG. 3, base 12 defines at least one and preferably a plurality of openings 30, 32, 34, 36 there through, and in the exemplary embodiment four openings 30, 32, 34, 36 are shown, although more or fewer also can be used. A central aperture 38 also is provided through base 20.

Dome 22 is substantially concave facing toward base 20, and is of similar outer dimension to base 20. In the exemplary embodiment, dome 22 defines upper and lower annular flanges 40, 42. It should be understood that fastener 10 can be used in various different orientations including vertical, horizontal and angular. A post 44 is defined substantially centrally in dome 22 and projects outwardly of dome 22 relative to base 20. Post 44 is hollow and includes substantially axial slots 46, 48 on diametrically opposite sides thereof extending inwardly from a distal end 50 of post 44, thereby separating post 44 into opposed legs 52, 54. Distal portions of legs 52, 54 inwardly from distal end 50 define outward protuberances 56, 58, respectively, which together form the widest portion of post 50. Protuberances 56, 58 in the exemplary embodiment are comprised of single segments each spanning the outer surface of legs 52, 54, respectively. However, it should be understood that protuberances 56, 58 can be more narrow than the full width of legs 52, 54 or can be comprised of two or more segments on each leg 52, 54. From protuberances 56, 58 the distal portion of post 50 angles or tapers radially inwardly toward distal end 50.

Supports 24, 26 are pillar-like structures disposed between and connected to base 20 and dome 22 on opposite ends thereof. Supports 24, 26 are integrally formed with base 20 and dome 22 as a single monolithic body. Supports 24, 26 are configured to provide a desired level of rigidity to clip 12 between base 20 and dome 22, and may be in the form of walls having a desired length for stiffness. Supports 24, 26 further provide the desired separation between base 20 and dome 22, to accommodate foam or other fillers used in the assembly.

Figure 6:
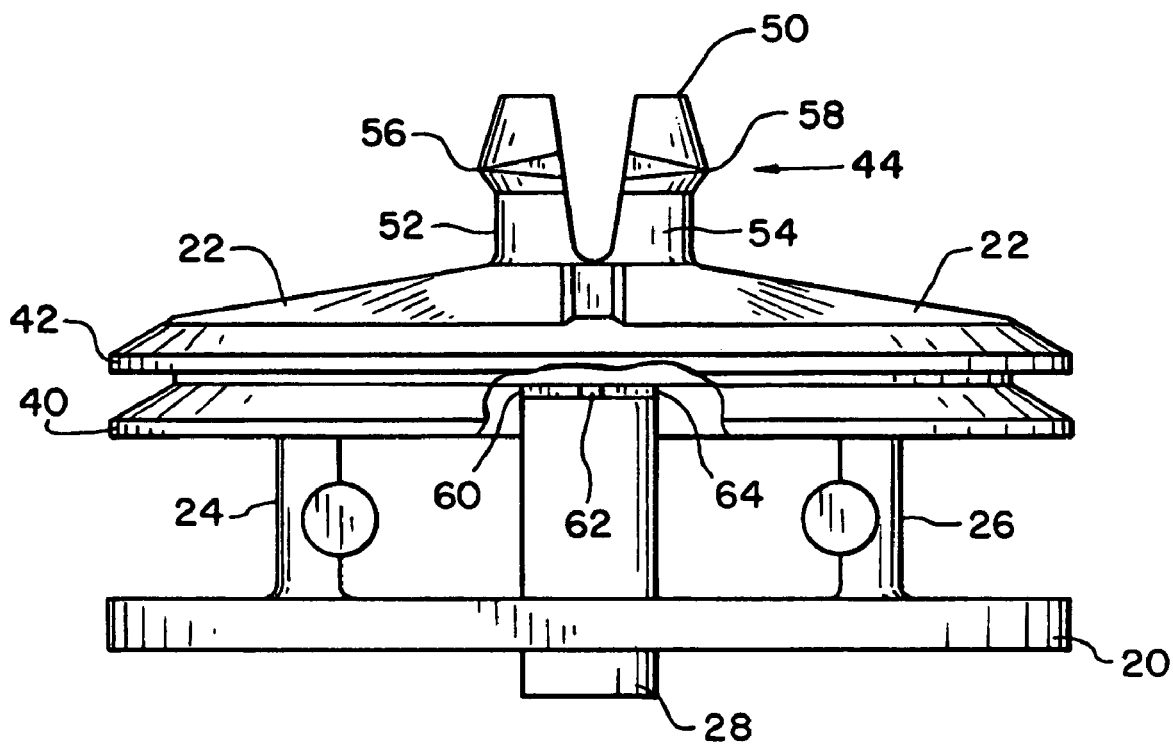
FIG. 6 is an elevational view, partially broken away, of the fastener clip before connection of the magnet assembly.
Figure 7:
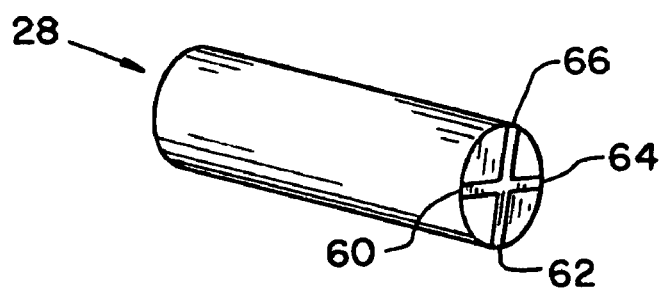
FIG. 7 is a perspective view of a pin of the fastener clip shown separated from the main portion of the clip.

Pin 28 is a substantially cylindrical body, as seen most clearly in FIG. 7. In the manufactured condition of clip 12, during the molding or other formation of clip 12, pin 28 is aligned with and connected within the axial opening through hollow post 44. Pin 28 is connected within dome 22 by one or more frangible links, such as at the peripheral edges thereof has indicated generally at positions 60, 62, 64, 66 shown in FIG. 7. Intact frangible link positions 62, 64, 66 are shown in FIG. 6. Accordingly, as manufactured, clip 12 is a single, integral unit. Subsequently, however, pin 28 becomes disconnected, as will be described subsequently herein. The exemplary embodiment shows four frangible connections at positions 60, 62, 64, 66; however, more or fewer frangible connections can be used.

Magnet assembly 14 includes both carrier 16 and a magnet 18. Carrier 16 is a circular structure having a bottom 70 and an annular sidewall 72. A hole 74 is defined in bottom 70. Hole 74 has a diameter to receive post 44 therein inwardly of protuberances 56, 58. The diameter of hole 74 is smaller than the maximum diameter of post 44 at protuberances 56, 58, with legs 52, 54 in outward, non-deflected positions. Preferably, carrier 16 is metal so that magnet 18 can be retained therein without the need for adhesive or the like. However, those skilled in the art will understand readily that adhesive can be used, and carrier 16 can be made of other materials, such as plastic.

Magnet 18 is an annular or doughnut-like magnetic body of a size to fit within carrier 16. Magnet 18 has a central hole 76 larger than a hole 74, whereby protuberances 56, 58 can freely overlap bottom 70 adjacent hole 74.

Fastener 10 is secured to a headliner or the like (not shown) by placing base 20 against a substrate (not shown)

of the headliner and attaching it with glue or the like. The glue or other adhesive will pass through openings 30, 32, 34, 36 in base 20 to adhere and physically lock base 20 against the headliner. In known manner, foam can be applied over the headliner material or substrate and around base 20 and supports 24, 26, below annular flanges 40, 42. Annular flanges 40, 42 contain the foam and prevent the foam from flowing around or near carrier 16.

Carrier 16 is attached to clip 12 by inserting distal end 50 of post 44 into central hole 74, and pushing carrier 16 along post 44 and over protuberances 56, 58. The tapered configuration of post 44 between protuberances 56, 58 and distal end 50 assists in locating carrier 16 on post 44, and in aligning carrier 16 for proper insertion on post 44. The tapered configuration further assists in deflecting legs 52, 54 as necessary for passing carrier 16 fully and completely onto post 44. Since post 44 is hollow, with slots 46, 48 on opposite sides thereof, individual legs 52, 54 are deflected inwardly so that protuberances 56, 58 will pass through hole 74. Upon protuberances 56, 58 passing fully through hole 74, legs 52, 54 rebound outwardly such that protuberances 56, 58 overlap bottom 70 adjacent hole 74. To lock carrier 16 in proper position on post 44, pin 28 is pushed into distal regions of post 44. In the as-manufactured condition, pin 28 is aligned with the axial opening extending through hollow post 44, and pin 28 is connected only by frangible links 60, 62, 64, 66. From its as-manufactured position, pin 28 can be pushed by hand or mechanically. Frangible links 60, 62, 64, 66 will rupture, allowing pin and 28 to be moved deeply into post 44 to a blocking position between and adjacent legs 52, 54 whereby legs 52, 54 are restricted from inward deflection. Mechanical pushing on pin 28 to rupture frangible links 60, 62, 64, 66 and advance pin 28 into post 44 can be accomplished with a pusher that is forced against pin 28 and advanced through aperture 38 before base 20 is connected to the headliner. With pin 28 inserted into post 44, legs 52, 54 can not be deflected inwardly and are retained in the outward position with protuberances 56, 58 overlapping bottom 70. Accordingly, carrier 16 is locked in position on post 44.

Magnet 18 is placed in carrier 16, and if carrier 16 is metal can be retained therein without adhesive. Magnet 18 can be placed within carrier 16 at various times during the assembly process, either before clip 12 is attached to the headliner (not shown) or at some time thereafter. Magnet 18 can be placed within carrier 16 before or after carrier 16 is connected to clip 12.

Carrier 16 can be fitted on post 44 somewhat loosely. Dome 22 has a convex surface confronting carrier 16, thereby angling away from bottom 70 outwardly of post 44. Accordingly, carrier 16 can tilt on post 44 in any direction, thereby allowing carrier 16 and magnet 18 therein to align for substantially flush engagement against the automobile roof (not shown) for a firm connection of fastener 10 to the roof. Further, during installation or use carrier 16 and clip 12 can tilt slightly relative to each other to accommodate pushing force exerted there against without fracturing.

In other embodiments of the present invention, the carrier can be eliminated. For example, the present invention is capable of use in combination with a dual locking pads of the hook and loop type commonly available from 3M. Various adhesive patch is also can be used. The mating structure is provided with a hole in a somewhat rigid base to attach to post 44 as described above.

It should be understood further that the various components of the present invention can be provided in different shapes, sizes and configurations. The components shown and described as being round or annular can be of other shapes as well.

Although the invention has been shown and described in connection with attaching automobile headliners to automobile roofs, the invention is capable of solving other blind fastener application difficulties in automobiles and in other structures. Application and use for attaching a headliner to a roof is merely described as one example of a suitable application of the present invention.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A fastener, comprising:
a fastener clip having a base and a post with an opening and deflectable legs, said clip including a dome and at least one support between said base and said dome, said dome being in spaced apart relation to said base with said at least one support being a vertical pillar disposed between and connected to said base and said dome on opposite ends thereof such that said dome is positioned over and above said base so as to define an open area therebetween said post and said deflectable legs extending outwardly of said dome and away from said base;
a magnet assembly defining a hole having a diameter for receiving said legs therethrough;
a protuberance on at least one of said legs overlapping a portion of said magnet assembly adjacent said hole; and
a pin being separate and apart from said at least one support and connected to said clip by at least one frangible link extending between said pin and said clip in said opening of said post in a pre-assembly position, said pin extending between said base and said dome and beneath said post in said pre-assembly position, said pin being in axial alignment with said legs in said pre-assembly position, said pin being adapted to be driven to an assembled position to be disposed between said legs to prevent inward deflection of said legs for securing said protuberance in said overlapping position, said at least one frangible link being adapted to rupture when said pin is driven between said legs.

2. The fastener claim 1, including a protuberance on each said leg, each said protuberance overlapping a portion of said magnet assembly adjacent said hole.

3. The fastener of claim 2, wherein said at least one rupturable frangible link is between said pin and said post.

4. The fastener of claim 1, said dome being convex on a surface confronting said magnet assembly.

5. The fastener of claim 1, said base defining a plurality of openings therethrough.

6. The fastener of claim 5, including a protuberance on each said leg, each said protuberance overlapping a portion of said magnet assembly adjacent said hole.

7. The fastener of claim 6, said dome including upper and lower flanges.

8. A fastener clip, comprising:

a base;

a dome in spaced apart relation from said base, such that said dome is positioned over and above said base so as to define an open area therebetween;

a plurality of vertical supports between said base and said dome;

a hollow post having an opening and extending outwardly of said dome, and away from said base, said post having one end attached to said dome, and said post including at least one deflectable portion having an outward protuberance thereon at an end of said post opposite said end of said post that is attached to said dome; and a magnet assembly defining a hole having a diameter receiving said at least one deflectable portion therethrough; said outward protuberance overlapping a portion of said magnet assembly adjacent said hole; and a pin being separate and apart from said plurality of supports, substantially in axial alignment with said post in a pre-assembly position and connected thereto by at least one frangible link extending between said pin and said post in said opening of said post, said pin extending between said base and said dome and beneath said post in said pre-assembly position, said at least one frangible link being adapted to rupture when said pin is driven within said post.

9. The fastener clip of claim 8, said post including substantially axial slots diametrically opposed to each other and extending inwardly from a distal end of said post.

10. The fastener clip of claim 8, said base defining an aperture therethrough, said aperture being in substantial alignment with said pin.

11. The fastener clip of claim 10, said pin connected to said post by a plurality of frangible links.

12. The fastener clip of claim 11, said post including substantially axial slots diametrically opposed to each other and extending inwardly from a distal end of said post.

13. The fastener clip of claim 12, said base defining a plurality of openings therethrough.

14. The fastener clip of claim 13, said the dome defining at least first and second spaced annular flanges.

15. An automobile headliner fastener, comprising:

a fastener clip including a base adapted for attachment to a headliner, a dome in spaced relationship to said base and a plurality of supports between said base and said dome, said dome being in spaced apart relation to said base with said plurality of supports being vertical pillars disposed between and connected to said base and said dome on opposite ends thereof, such that said dome is positioned over and above said base so as to define an open area therebetween;

a post projecting outwardly of said dome and away from said base, said post being hollow and having an opening and a deflectable portion, said deflectable portion having an outward protuberance thereon;

a magnet assembly including a carrier disposed on said post and a magnet disposed in said carrier, said carrier having a bottom encircling said post between said dome and said protuberance; and a pin being separate ad apart from said plurality of supports and connected to said clip by at least one frangible link between said pin and said clip in said opening of said post in a pre-assembly position, said pin extending between said base and said dome and beneath said post in said pre-assembly position, said pin being in axial alignment with said post in said pre-assembly position, said pin being adapted to be driven to an assembled position to be disposed in said hollow post adjacent said deflectable portion, said at least one frangible link being adapted to rupture when said pin is driven to said assembled position.

16. The headliner fastener of claim 15, said post including first and second diametrically opposed axial slots extending inwardly from a distal end of said post, said axial slots defining first and second legs in said post, each said leg having an outward protuberance thereon.

17. The headliner fastener of claim 16, said base defining a central aperture aligned with said hollow post.

18. The headliner fastener of claim 15, said base defining an aperture aligned with said hollow post.

19. The headliner fastener of claim 18, said base defining a plurality of openings therethrough.

* * * * *